United States Patent Office 3,024,169
Patented Mar. 6, 1962

3,024,169
PROCESS FOR THE PRODUCTION OF PENICILLIN
Arnold Lester Demain, Westfield, N.J., and Norman Leonard Somerson, Elysburg, Pa., assignors to Merck & Co., Inc., Rahway, N.J., a corporation of New Jersey
No Drawing. Filed Nov. 23, 1959, Ser. No. 854,581
4 Claims. (Cl. 195—36)

This invention relates to the microbiological production of penicillin and in particular to improved nutrient media for the microbiological production of penicillin whereby the yield of penicillin will be improved.

In the microbiological fermentation process for producing penicillin, a suitable penicillin-producing microorganism is added to a sterilized nutrient medium and the medium incubated for a period of time. The nutrient medium usually contains a nitrogen source, a carbon source, mineral salts and various other ingredients. During the incubation the batch is usually agitated and aerated while it is maintained at a temperature of the order of 25° C. After the period of incubation, the broth is filtered and the penicillin is isolated from the supernatant liquid.

According to our invention, the yield of penicillin from such a microbiological process is increased by adding to the nutrient medium a small quantity of adipic acid, α-amino adipic acid or glutaric acid.

The reason for this is not entirely clear. The presence of lysine in the nutrient medium tends to inhibit penicillin production, the effect being significant when the concentration of the lysine exceeds a certain value. The addition of one or more of the additives enumerated appears to counteract this inhibitory action of lysine, the effect of the additive being more important when the concentration of the lysine is such as that its own inhibitory action is significant.

Our invention is particularly useful when corn steep liquor is employed in the nutrient medium (usually as a nitrogen source), for it contains a small amount of lysine (of the order of 0.5 percent of the corn steep liquor). The resulting concentration of lysine in the nutrient medium is considerably less than 0.5 percent, since corn steep liquor is usually less than ten percent of the nutrient medium. This low concentration of lysine in the nutrient medium caused by the lysine in the corn steep liquor does not, of itself, appear to significantly inhibit the production of penicillin. But some of the other nutrients either contain lysine or precursors of lysine, so that, when the microbiological process is in operation, the concentration of lysine in the broth tends to reach the point at which it significantly inhibits the production of penicillin. In such a situation we have found that the addition of adipic acid, α-amino-adipic acid or glutaric acid in small amounts significantly increases the yield of penicillin over that resulting when no such addition is made.

In the preferred method for practicing this invention, penicillin G is produced by the growing of a penicillin producing strain of *Penicillium chrysogenum* Q176 in a submerged culture in an aqueous nutrient medium containing corn steep liquor, crude lactose, potassium dihydrogen phosphate, calcium carbonate, magnesium sulfate heptahydrate; soybean oil, a suitable precursor for penicillin G, and as an additive, one of the compounds of the group consisting of adipic acid, glutaric acid and α-amino adipic acid. Other compounds may also be included in the medium if desired. The precursor for penicillin G is preferably either phenylacetylethanolamine or phenylacetic acid.

After the growth period, which is of the order of one week, the mycelium is filtered off, and the penicillin is extracted from the supernatant liquid in a yield about 10% higher than that obtained by using a medium as described, but without the additive.

The following examples are given for the purpose of illustration:

Example 1

An aqueous fermentation medium was prepared having the following composition:

|  | Percent |
|---|---|
| Corn steep solids | 3.5 |
| Lactose, crude | 5.5 |
| $KH_2PO_4$ | 0.7 |
| $CaCO_3$ | 1.0 |
| $MgSO_4.7H_2O$ | 0.3 |
| Phenylacetylethanol amine | 0.25 |
| Soybean oil | 0.25 |
| Adipic acid | As designated |

The medium was then divided into 25 ml. quantities and placed in 75 ml. vials. The vials were then sterilized by autoclaving at 15 p.s.i.g., 120° C. for a period of 15 minutes. Each vial was then inoculated with a mutant strain of *Penicillium chrysogenum* Q176. 2 ml. of inoculum was added.

After inoculation, the inoculated broths were maintained at 25° C. on a rotary shaker. The shaker was operated at 220 r.p.m. with 2 inches thrust. The period of incubation was 7 days. At the end of this period, the samples were tested for penicillin concentration.

The following table illustrates the effect of variation of the percentage of adipic acid in the nutrient medium on the yield of penicillin produced. The assay procedure has a precision of 200 u./ml.

| Run No. | Percent adipic acid | Penicillin activity, u./ml. |
|---|---|---|
| 1a | 0.00 | 5,740 |
| 1b | 0.04 | 5,750 |
| 1c | 0.08 | 5,800 |
| 1d | 0.16 | 5,970 |
| 1e | 0.20 | 6,090 |

Example 2

A fermentation similar to that described in Example 1 was carried out, except that adipic acid was replaced with α-amino adipic acid in the nutrient medium. The following table illustrates the effect of changing the percentage of α-amino adipic acid in the nutrient medium on the yield of penicillin produced:

| Run No. | Percent α-amino adipic acid | Penicillin activity, u./ml. |
|---|---|---|
| 2a | 0.00 | 5,620 |
| 2b | 0.04 | 5,973 |
| 2c | 0.08 | 6,260 |
| 2d | 0.16 | 6,330 |

Example 3

An aqueous fermentation medium was prepared having the following composition:

|  | Percent |
|---|---|
| Corn steep solids | 3.5 |
| Lactose, crude | 5.5 |
| $KH_2PO_4$ | 0.7 |
| $CaCO_3$ | 1.0 |
| $MgSO_4.7H_2O$ | 0.3 |
| Phenylacetylethanolamine | 0.25 |
| Soybean oil | 0.25 |
| DL-valine | 0.03 |
| L cysteine HCl | 0.02 |
| Adipic acid | As designated |

The medium was treated in the same manner as described in Example 1. The following table illustrates the effect on changing the percentage of adipic acid in the above nutrient medium, on the yield of penicillin:

| Run No. | Percent adipic acid | Penicillin activity, u./ml. |
|---|---|---|
| 3a | 0.00 | 5,370 |
| 3b | 0.08 | 5,600 |
| 3c | 0.16 | 5,720 |

*Example 4*

An aqueous fermentation medium was prepared having the following composition:

| | Percent |
|---|---|
| Corn steep liquor | 7.7 |
| $KH_2PO_4$ | 0.67 |
| $CaCO_3$ | 0.48 |
| $MgSO_4 \cdot 7H_2O$ | 0.29 |
| Soybean oil | 0.24 |
| Defoamer [1] | 0.06 |
| Adipic acid | As designated |

[1] The defoamer can be a mixture of cotton seed oil, soybean oil, corn oil and coconut oil such as is sold by the Bio-Compounds Co. of Chicago, Ill. under the trade designation CLRS Defoamer.

3.3 liters of this medium was placed in each of three 5 liter fermentors. The fermentors were then sterilized at 15 p.s.i.g., 120° C. for a period of 90 minutes. Each fermentor was then inoculated with 9% by weight of the broth of a mutant strain of *Penicillium chrysogenum* Q176. After inoculation, the broths were maintained at 25° C. for a period of 7 days. Each fermentor was agitated at 600 r.p.m. Air was sparged into each fermentor at 3 liters per minute. During this 7-day period, an aqueous composition containing the following constituents was added at the rate of 4 ml. per hour after the first 24 hours of operation:

| | Percent |
|---|---|
| Invert molasses | 34.1 |
| Phenyl acetic acid | 1.72 |
| 28% aqueous $NH_3$ | .42 |
| $MgSO_4 \cdot 7H_2O$ | .41 |

Additional defoamer, of the same type as originally incorporated in the medium, or some other type, may be added as required during fermentation to counteract excessive foaming.

At the end of the 5-day period, the broths were analyzed for penicillin content. The following table illustrates the effect of changing the percent adipic acid in the nutrient medium on the yield of penicillin:

| Run No. | Percent adipic acid | Penicillin activity, u./ml. |
|---|---|---|
| 4a | 0.0 | 5,840 |
| 4b | 0.2 | 6,140 |
| 4c | 0.3 | 6,510 |

*Example 5*

A fermentation similar to that of Example 4 was carried out with the exception that adipic acid was contained in the feed as well as in the initial charge to the fementor. The following table illustrates the effect of adipic acid in the feed to the fermentor:

| Run No. | Percent adipic acid initially | Percent adipic acid in feed | Penicillin activity, u./ml. |
|---|---|---|---|
| 5a | 0.1 | 0.2 | 6,350 |
| 5b | 0.3 | 0.0 | 6,510 |

The two methods of addition of adipic acid give essentially the same results with respect to penicillin yield.

*Example 6*

An aqueous fermentation medium as described in Example 3 was prepared, except that 1% CLRS defoamer was added to the medium, and the medium contained glutaric acid rather than adipic acid.

The medium was treated in the same manner as described in Example 1. The following table shows the effect of adding glutaric acid to the nutrient medium, on the yield of penicillin:

| Run No. | Percent glutaric acid | Penicillin activity, u./ml. |
|---|---|---|
| 6a | 0.00 | 6,643 |
| 6b | 0.1 | 7,033 |
| 6c | 0.2 | 6,988 |

*Example 7*

An aqueous fermentation medium was prepared having the composition of the medium described in Example 1. The medium was treated in the same manner as in Example 1, except that varying amounts of adipic acid were added to 250 ml. Ehrlenmeyer flasks containing 50 milliliters of nutrient medium at daily intervals over a period of five days. This intermittent addition commenced one day after inoculation. The following table shows the effect of such intermittent feeding of adipic acid to the nutrient medium of the yield of penicillin, in units/ml.

| Run No. | Initial percent of adipic acid | Feed rate percent of original solution per day of adipic acid | Penicillin activity, u./ml. |
|---|---|---|---|
| 7a | 0.0 | 0.00 | 4,510 |
| 7b | 0.1 | 0.04 | 6,385 |
| 7c | 0.1 | 0.08 | 5,355 |

*Example 8*

An aqueous fermentation medium was prepared having the composition of the medium described in Example 1 except that varying quantities of lysine were added to the medium whereby the inhibitory effect of lysine on penicillin production, and the reversal of this inhibitory effect by adipic acid, was observed.

The following table of results illustrates the effect of lysine inhibition of penicillin production, and the reversal of this inhibition by the utilization of adipic acid:

| Run No. | Percent lysine added | Percent adipic acid | Penicillin activity, u./ml. |
|---|---|---|---|
| 8a | 0.0 | 0.0 | 3,840 |
| 8b | 0.1 | 0.0 | 3,039 |
| 8c | 0.2 | 0.0 | 2,336 |
| 8d | 0.4 | 0.0 | 2,055 |
| 8e | 0.0 | 0.2 | 4,792 |
| 8f | 0.1 | 0.2 | 2,964 |
| 8g | 0.1 | 0.3 | 3,410 |
| 8h | 0.2 | 0.2 | 3,050 |
| 8i | 0.2 | 0.4 | 2,996 |
| 8j | 0.2 | 0.6 | 3,140 |
| 8k | 0.2 | 0.8 | 3,310 |

Runs 8a, 8b, 8c and 8d of Example 8 show the effect of inhibition on penicillin activity by increasing quantities of lysine. Increasing the amount of lysine decreases the penicillin activity. Comparing runs 8b, 8e, 8f and 8h–k, it is apparent that adding adipic acid reverses the effect of the lysine. As the precision of the assay for penicillin activity is plus or minus 200 units per milliliter, the apparent failure of an addition of 0.2% adipic acid to a medium containing 0.1% lysine in reversing the inhibition action of the lysine is insignificant. It is to be noted that adding 0.3% adipic acid did effectively reverse the inhibitory action of 0.1% lysine.

*Example 9*

A fermentation similar to that described in Example 1 was carried out with the exception that the broth was removed from the vial after 77 hours on the rotary shaker. The broth was then centrifuged. The supernatant liquid was removed and the residue was suspended in an aqueous medium of the following composition for a period of 24 hours.

20% 1 molar phosphate buffer (138 gm./liter $$NaH_2PO_4 \cdot H_2O$$

adjusted to pH of 7 with NaOH)
0.94% $(NH_4)_2HPO_4$
20% salts solution consisting of:
    5 gm./liter $Na_2SO_4$
    0.2 gm./liter $ZnSO_4 \cdot 7H_2O$
    2.5 gm./liter $MgSO_4 \cdot 7H_2O$
    30 gm./liter $KH_2PO_4$
    0.05 gm./liter $CuSO_4 \cdot 5H_2O$
    0.5 gm./liter $CaCl_2 \cdot 2H_2O$
    0.2 gm./liter $MnSO_4 \cdot H_2O$
    1.0 gm./liter $FeSO_4 \cdot 7H_2O$ The suspension was then centrifuged and the precipitate was suspended in an aqueous medium having the following composition:

.05 M phosphate buffer (6.9 gm./liter of $NaH_2PO_4 \cdot H_2O$
    adjusted to a pH of 7 with NaOH)
3% lactose
.1% phenyl acetylethanol amine.

The suspension was then placed in a flask on a rotary shaker operating at 220 r.p.m. After 8 hours and after 16 hours, the activity of the penicillin was measured.

The following table illustrates the effects of lysine and α-amino adipic acid on the production of penicillin:

| Run No. | Additive | Concentration of additive, mg./ml. | Rate of penicillin production between 8 and 16 hrs. (u./ml./hr.) |
|---|---|---|---|
| 9a | 0 | | 14.0 |
| 9b | L-lysine-HCl | .9 | 9.4 |
| 9c | α-amino adipic acid | .8 | 20.5 |

The above description and examples are intended to be illustrative only. Any modification of, or variation therefrom, which conforms to the spirit of the invention, is intended to be included within the scope of the claims.

We claim as our invention:

1. In the fermentation process for the production of Penicillin G, the step of adding to the nutrient medium, in an amount from about .02 percent to about .8 percent by weight of the nutrient medium, a compound having the formula

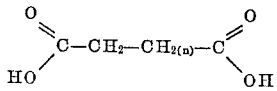

wherein *n* is an integer from 2 to 3.

2. The process of claim 1 in which corn steep liquor is a constituent of the nutrient medium.

3. A method for increasing the yield of Penicillin G produced by the submerged fermentation of a penicillin producing strain of *Penicillium chrysogenum* Q176 in a liquid nutrient medium containing corn steep liquor which comprises adding adipic acid to said medium in an amount from about .02% up to about .8% by weight of the medium.

4. The process of claim 3 in which the adipic acid is added in the amount of approximately .3%.

References Cited in the file of this patent

UNITED STATES PATENTS

| 2,538,721 | Collingsworth | Jan. 16, 1951 |
| 2,563,793 | Moyer | Aug. 7, 1951 |

FOREIGN PATENTS

| 499,231 | Canada | Jan. 12, 1954 |